Aug. 12, 1952 J. V. DYRR 2,606,414
STOP MECHANISM FOR IMPLEMENT ADJUSTING CYLINDERS
Filed Aug. 16, 1947 2 SHEETS—SHEET 1
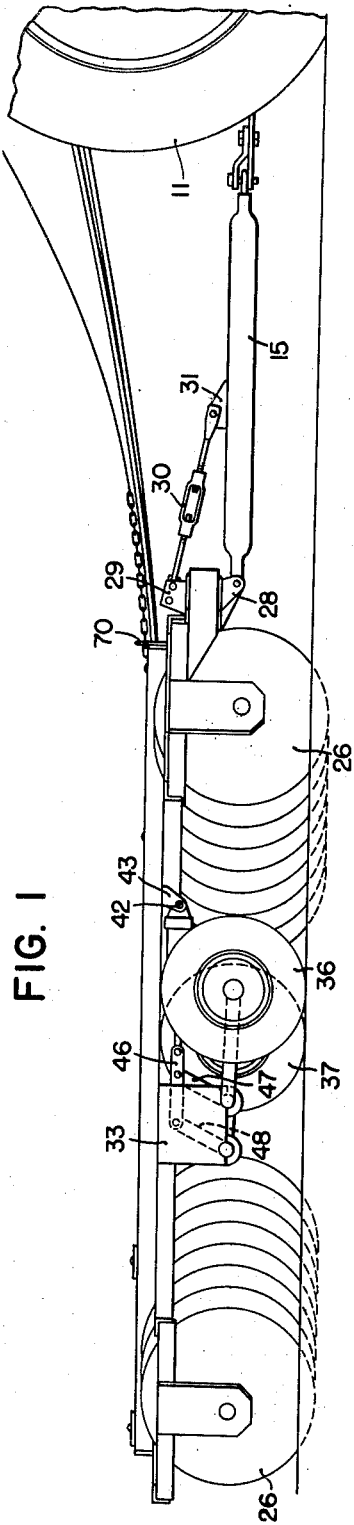
INVENTOR:
JACOB V. DYRR
BY Paul O Pippel
ATTORNEY

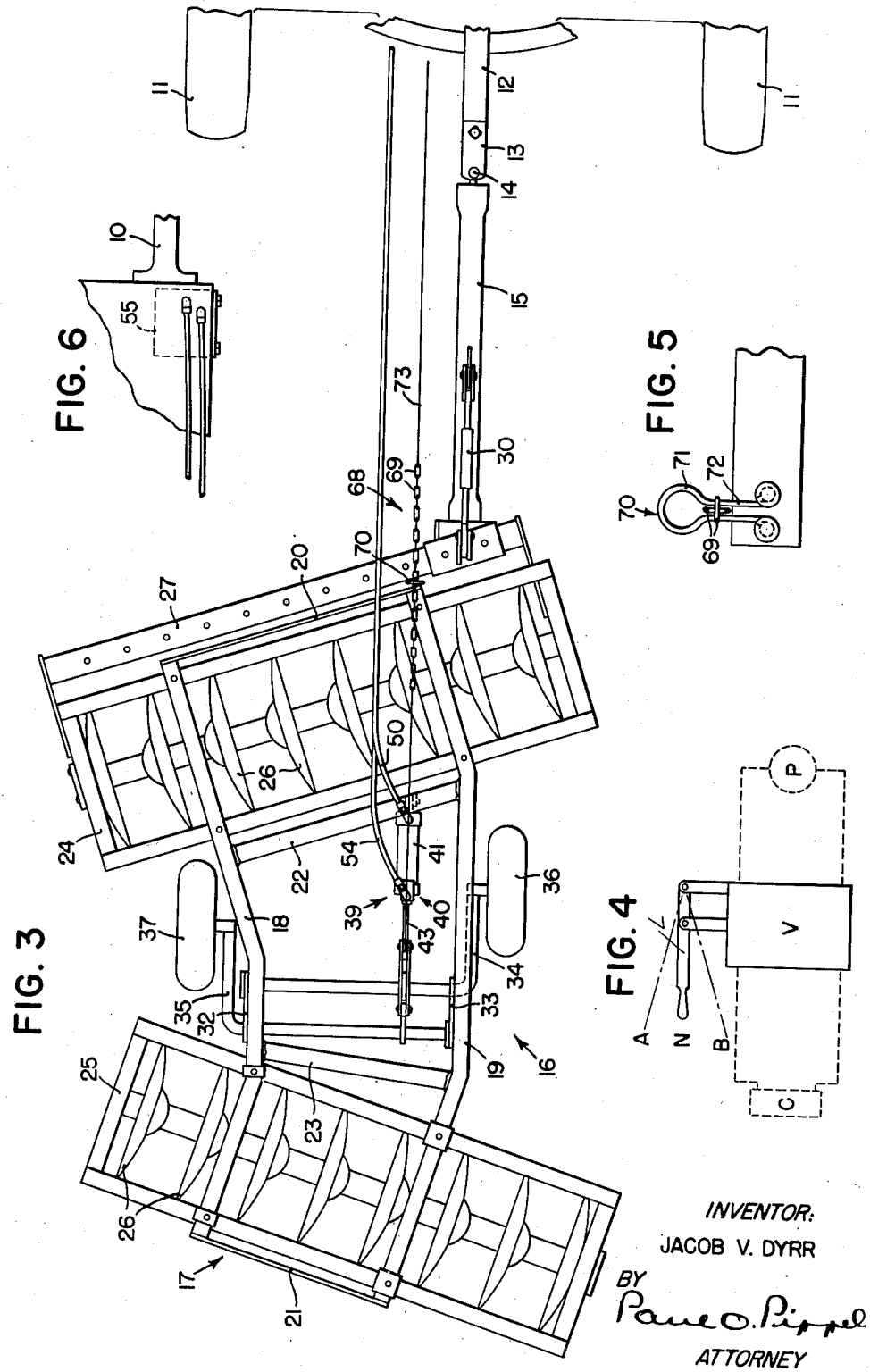

Patented Aug. 12, 1952

2,606,414

UNITED STATES PATENT OFFICE 2,606,414

STOP MECHANISM FOR IMPLEMENT ADJUSTING CYLINDERS

Jacob V. Dyrr, Bell, Calif., assignor to International Harvester Company, a corporation of New Jersey Application August 16, 1947, Serial No. 768,959

9 Claims. (Cl. 55—73)

This invention relates to power control means, particularly for agricultural implements, and more specifically concerns mechanism for transmitting power from the power plant of a tractive vehicle to an implement or the like connected to the vehicle in trailing relation thereto.

In the control of tractor drawn agricultural implements wherein the implement or vehicle is pivotally connected to the tractor for movement relative thereto, it is known to provide flexible power connections between the tractor power plant and a remotely controlled work member mounted on the implement whereby the tractor operator may control the operation of the implement from his seat on the tractor. Such an operation may be the regulation of the depth of ground penetration of a tillage tool such as is described herein, which involves the vertical adjustment of an earth working tool relative to ground supports. A device in use for transmitting power from a tractor to an implement is a hydraulic fluid carried in a reservoir upon the tractor and delivered under pressure by a pump driven by the tractor power plant to a hydraulic ram unit mounted upon the implement, through the intermediary of flexible hose connections. One of the methods of control of the quantity of fluid passing from the reservoir to the ram unit on the implement is often referred to as the "nudging" system, wherein valves in the lines supplying fluid to the ram unit are manipulated by a control lever accessible to the tractor operator to open and close the supply lines and feed fluid to the ram unit in small increments. Since the ram piston is operatively connected to the adjustable element of the implement, the tractor operator, by manipulating the tractor control lever or levers has been able to select an operating position for his implement.

The principal fault of such a system, however, has been that the remote control of an implement in such a manner, and the finding of the desired operating position thereof has been a matter of guess work, or trial and error. This defect has been particularly noticeable when an attempt is made to return the earth working tool of a tillage implement, for example, to its chosen operating position after it has been lifted from the ground as in turning at the end of a field, or to clear an obstruction.

An important object of this invention is, therefore, in general, to provide means for assuring the return of the operating parts of an implement to the desired operating position after it has been withdrawn therefrom.

Another object of the invention is to provide stop means associated with the ram unit on a trail-behind implement selectively operable to stop the movement of the work member or piston when it has been driven a distance relative to the cylinder corresponding to the amount of movement when the operator desires to impart to the implement adjustable part.

Another object of the invention is to provide stop means limiting the piston stroke of a fluid cylinder device, wherein the fluid itself functions as the stop mechanism when the selected piston position, and therefore the selected implement operating position, has been reached.

Another object of the invention is to provide a hydraulic stop for a hydraulic ram unit.

A further object of the invention is to provide for use with a hydraulic ram unit mounted upon a tractor drawn implement, the operation of which is remotely controlled from the tractor, adjustable stop means associated with the ram unit for limiting the stroke of the ram piston wherein the position of said stop means and therefore the extent of movement of said piston is also remotely controlled from the tractor.

With such a device as is described herein a farmer operating a tractor to which is pivotally connected a trail-behind implement may accurately exercise complete control over his implement from his position on the tractor and regulate the operation of the implement by power derived from the tractor. He may, for example, select an operating depth for his working tools with the assurance the tools will return to that operating depth when his implement is raised out of the ground and returned to operating position. He may likewise, if he wishes, without dismounting from the tractor, adjust the stop means on his ram unit so that the tools will operate at another selected depth.

Other objects and advantages of the invention will become clear from the following detailed description, when read in conjunction with the accompanying drawings, wherein:

Fig. 1 is a view in side elevation of the rear portion of a tractor showing an offset disk harrow connected thereto in trailing relation and having thereon a hydraulically actuated ram unit embodying the features of the present invention;

Fig. 2 is a sectional view of the ram unit and the stop means limiting the stroke of the piston;

Fig. 3 is a plane view of the structure shown in Fig. 1;

Fig. 4 is a diagrammatic showing of valve control means for the hydraulic ram unit;

Fig. 5 shows a portion of the ram unit adjusting mechanism; and

Fig. 6 is a detail of a portion of the tractor body showing in dotted lines the position of the fluid pump.

Referring now to the drawings, there is disclosed the rear portion of a tractor having a body portion 10, rear traction wheels 11, and a drawbar 12. Drawbar 12 is provided with a clevis 13 and a pivot pin 14 to which is pivotally connected the forward end of the hitch frame 15 of a trail-behind offset disk harrow 16. It will be observed that by virtue of the pivotal connection of hitch 15 with drawbar 12 the harrow 16 is capable of lateral swinging movement relative to the tractor. It will also be noted that sufficient play is provided in the connection to pivot pin 14 to accommodate generally vertical movement of the implement relative to the tractor.

The implement 16 comprises a rigid frame 17 including laterally spaced angled frame bars 18 and 19 connected by front and rear members 20 and 21, respectively, and provided with intermediate braces 22 and 23. Frame 17 serves as a support for fixed angle front and rear harrow sections 24 and 25, respectively carrying disks 26. Front harrow section 24 has secured and extending parallel thereto a draft bar 27 to which is secured a depending bracket 28 serving for the pivotal connection of the rear end of hitch frame 15. An upwardly extending bracket 29 serves for the connection thereto of one end of a turn buckle 30, the other end of which is connected to a lug 31 affixed to hitch frame 15.

Secured to frame 17 and depending therefrom are brackets 32 and 33 in the lower ends of which are journaled the transverse portions of a pair of crank axles 34 and 35 upon which are mounted, respectively, ground engaging wheels 36 and 37. Ground wheels 36 and 37 serve to support the harrow in transport position, and by swinging the crank axles 34 and 35 vertically about their pivots, gauge the depth of operation or degree of penetration of the disks 38.

Movement of the wheels 36 and 37 to raise and lower the implement 16 is accomplished by power lift mechanism generally indicated at 39. Lift mechanism 39 includes a hydraulic ram 40 comprising a cylinder 41 pivotally connected at 42 to a lug 43 affixed to and depending from frame brace 22. Slidable within cylinder 41 is a piston 44 provided with a piston rod 45. The end of rod 45 projecting from the cylinder is pivotally connected to one end of a link 46 which extends longitudinally of the implement and has pivotally connected thereto at spaced locations the upper ends of a pair of rock arms 47 and 48 secured, respectively, to the transverse portions of crank axles 34 and 35 and extending upwardly therefrom.

Power cylinder or ram 40 is of the double acting type, and it should be understood that upon extension of the piston rod 45 the arms 47 and 48 will be rocked in an anti-clockwise direction as viewed in Fig. 1 to lower the disks 26 to the operating position shown therein, and that retraction of the piston within the cylinder will swing the wheels 36 and 37 away from the harrow frame 17 to cause the disks to operate at a shallower depth or raise them to transport position. Fluid is supplied to a port 49 at the rear end of cylinder 41 through the intermediary of a flexible hose 50 to extend the piston and to a port 51 in a housing 52, forming a part of and extending upwardly from the head 53 of the cylinder, through the intermediary of a flexible hose 54. Hoses 50 and 54 extend forwardly to the tractor and are supplied with fluid under pressure from a tractor driven pump 55 indicated in dotted lines in Fig. 6.

The selective admission of fluid into either of hoses 50 or 54 and the return thereof through the other hose to the reservoir, wherein the closing of the feed line valve automatically closes the discharge line valve and locks the fluid in the cylinder and hose lines, is accomplished by suitable valve control mechanism indicated diagrammatically in Fig. 4 and interposed between the tractor pump and the implement ram unit. The valve control housing is designated by the letter V and the control lever by the letter L. The letter P designates the circuit taken by fluid from the tractor pump through one hose line to the valve structure and back to the reservoir through the other hose line. This occurs when the lever L is in its neutral position as indicated by the letter N. The letter C designates the circuit taken by the fluid between the valve housing and the cylinder. Movement of lever L to either of the positions A or B opens the lines between circuits P and C and allows fluid to flow from the pump through one or the other of the hose lines 50 or 54 to the cylinder, and upon return of the lever to neutral position the cylinder circuit is locked and fluid merely circulates in circuit P. Thus the control valve lever may be manipulated or nudged in one direction to open and close the associated valve structures as desired to admit increments of fluid to one end of the ram cylinder and simultaneously discharge corresponding amounts therefrom, the discharge of fluid being automatically stopped when the admission of fluid is discontinued. Manipulation of the lever in the other direction reverses the flow of fluid. Thus the fluid circuit may be opened to admit small amounts of fluid to advance or retract the ram piston as desired, and the locking of the fluid in the cylinder circuit locks the ram piston and the implement movable part connected thereto.

The elevation of the implement to a suitable height for transport presents no problem to the tractor operator. However, as pointed out before, in traversing a field to be worked it is necessary from time to time, where the soil in different parts of the field varies in density, for the operator to adjust the vertical position of the implement wheels to permit the disks 26 to penetrate to a greater or lesser depth, and it is important that he be able to accomplish this without leaving his seat upon the tractor. Likewise, it is necessary from time to time, as in turning at the end of the field, to raise and again lower the implement, and it is important that the implement return to the same operating position as before. The stop mechanism by which the extent of movement of the piston within the cylinder, and consequently the extent of movement of the implement wheels with respect to the frame may be limited is now to be described.

Referring now particularly to Fig. 2, it will be noted that portion 52 of cylinder head 53 constitutes the housing for a stop valve device generally indicated by the numeral 56, comprising a valve chamber 57 and a plunger 58 having a head portion 59 provided with a sealing ring 60. The valve chamber 57 is provided with a restricted portion 61 communicating with the port 51, and fluid entering from port 51 passes through the valve chamber into an opening 62 communicating with cylinder 41.

It will be observed that the plunger 58 is slidable in the valve housing in a direction parallel to piston rod 45, and the valve is normally held in the open position, as shown in Fig. 2 to allow the free passage of fluid to and from the cylinder by a spring 63, which abuts the valve housing at one end and plunger head 59 at the other. Thus, while the valve is held open, fluid may pass in either direction through the cylinder 41 from the hoses 50 or 54 to extend or retract the piston 44 and its rod 45 to raise and lower the implement.

In order to close valve device 56 to limit the stroke of the ram piston and lower the implement to the desired position for the degree of soil penetration selected, mechanism is provided including a vertically extending bracket 64 secured at its lower end to the link 56 and having a roller 65 mounted at its upper end upon a shaft 66 carried by the bracket 64. Trained around roller 65 is a cable 67, one end of which is secured to the end of plunger 58 projecting from housing 52, and the other end of which is connected to a chain 68 comprising links 69. Chain 68 is passed through a yoke 70 affixed to and extending upwardly from the front frame bar 20 and having an enlarged bight portion 71 and a restricted portion 72. The chain 68 may be freely passed through the enlarged portion of the yoke but is normally locked with respect thereto by closing one of the links 69 of the chain to fall into the restricted portion 72 of the yoke. The forward end of the chain is connected to one end of a cable 73, the other end of which extends forwardly to a suitable location accessible to the operator of the tractor.

It should now be understood that, in the operation of the device of the present invention, the chain 68 is normally locked in yoke 70, and that when the implement is in transport position, for example, slack is introduced into the chain 68 and cable 67, a housing 74 being provided for roller 65 to prevent displacement of the cable therefrom. Upon the introduction of fluid through hose 50 into cylinder 41 to extend piston 44 and its rod 45, arms 47 and 48 on crank axles 34 and 35 rock in an anti-clockwise direction, as viewed in Fig. 1, to swing the wheels 36 and 37 upwardly and lower the implement to operating position. Simultaneously, by virtue of the connection of piston rod 45 to link 46, bracket 64 carrying roller 65 moves in a direction to take up the slack in cable 67 and chain 68. When the chain and cable approach a taut condition they function as abutment means opposing the movement of the pistons. As the tension upon the cable 67 and chain 68 increases the valve plunger 58 is moved toward the closed position until its head 59 engages the shoulder 75 at the constricted end of valve chamber 57, overcoming the tension upon the spring. Pressure building up against the back of head 59 of the plunger as it moves to closed position hastens its closure before the chain and cable assembly becomes completely taut. Therefore, sufficient slack remains in the chain and cable structure to accommodate opening of the valve under the impact of fluid under pressure entering through port 51 and initiate return movement of the piston and the implement movable part connected thereto. When the valve structure controlling the flow of fluid under pressure through hose line 50 to the cylinder is closed there is no outlet for the fluid and the earth working tools are locked in the operating position desired. By suitable manipulation of the valves controlling the flow of fluid to conduits 50 and 54, the tractor operator may, when it is desired to again raise the implement, admit fluid under pressure to hose 54 to open valve 56 and permit fluid to return through hose 50 to the tractor reservoir. Suitable relief valve mechanism is, of course, provided preferably between the tractor pump and reservoir, to relieve the pressure when the plunger 58 moves to closed position.

When the operator desires to alter the stroke of the ram piston to cause the working tools to operate at a lower depth, without stopping the operation of the machine and without leaving his seat upon the tractor, he manipulates cable 73 to release chain 68 from the constricted portion of yoke 70 allowing another link of the chain to fall into place. The release of tension upon cable 67 allows the valve 56 to open and permit the passage of fluid from the cylinder until the cable again becomes taut, again closing the valve.

In order to raise the disks to operate at a shallower depth the operator merely manipulates the valves controlling the flow of fluid through the hoses, admitting sufficient fluid under pressure to hose 54 to open valve 56 and retract piston 44. Chain 68 may then be advanced in the yoke 70 and another link locked in place.

The operation of the hydraulic control mechanism of the present invention should be understood from the foregoing description. It should likewise be understood, however, that the invention has been described only in a preferred embodiment thereof and that modifications may be made therein without departing from the spirit of the invention or the scope of the appended claims.

What is claimed is:

1. In combination with a tractor having an operator's station and a power plant, an implement pivotally connected to the tractor in trail-behind relationship thereto having an adjustable part, a hydraulically operated device including a source of fluid pressure on the tractor deriving power therefrom, a hydraulic ram carried by the implement comprising a cylinder having a piston slidable therein connected to said adjustable part for moving the latter to an extent corresponding to the movement of the piston and a port formed in the cylinder at each side of the piston for the introduction to and discharge of fluid from the cylinder, flexible conduit means connecting the pressure source on the tractor to each of said ports for conveying fluid under pressure to either side of said piston and discharging fluid therefrom, stop means associated with said cylinder and piston for limiting the stroke of the piston and therefore the extent of movement of said implement adjustable part comprising a valve device interposed between one said conduit and said cylinder, means for normally holding said valve device open to the passage of fluid between the cylinder and said conduit, means for automatically closing said valve device after the piston has been driven a predetermined distance in said cylinder, and means accessible to and under the control of the tractor operator from his position thereon for varying the position of the piston at which said valve device is closed, whereby to adjust the stroke of the piston and therefore the extent of movement of the implement adjustable part.

2. In power control means for an implement having an adjustable part and adapted for connection to a tractor having a source of fluid under pressure, a hydraulic ram carried by the implement comprising a cylinder having a piston slidable therein connected to said adjustable part for moving the latter to an extent corresponding to the movement of the piston and a port formed in the cylinder at each side of the piston for the introduction to and discharge of fluid from the cylinder, flexible conduit means connected to said ports for directing fluid from the pressure source to one side of the piston and discharging fluid from the other, stop means associated with said cylinder and piston for limiting the stroke of the piston and therefore the extent of movement of said implement adjustable part comprising means carried by the ram providing a closure between said discharge conduit and said cylinder, flexible abutment mechanism carried on the implement and connected to said ram piston for opposing movement of the piston after it has been driven a predetermined distance, a connection between said abutment mechanism and said closure means for actuating the latter in response to movement of said piston, and means accessible to the tractor operator and controlled from his position thereon for adjusting said abutment mechanism.

3. In power control means for an implement having an adjustable part and adapted for connection to a tractor having a source of fluid under pressure, a hydraulic ram carried by the implement comprising a cylinder having a piston slidable therein connected to said adjustable part for moving the latter to an extent corresponding to the movement of the piston and a port formed in the cylinder at each side of the piston for the introduction to and discharge of fluid from the cylinder, flexible conduit means connected to said ports for directing fluid from the pressure source to one side of the piston and discharging fluid from the other, a valve device carried by the cylinder adjacent the discharge port thereof and having closure means, said valve device being normally open to establish communication between the cylinder and the discharge conduit, means serving as a pulley carried by said piston at a location remote from said cylinder, a flexible member trained on said pulley means and connected at one end to said valve closure means for closing the latter upon the application of tension to said flexible member, and means for anchoring the other end of said flexible member, whereby upon a predetermined movement of said piston said flexible member is placed under tension to close said valve device and stop the piston.

4. In power control means for an implement having an adjustable part and adapted for connection to a tractor having a source of fluid under pressure, a hydraulic ram carried by the implement comprising a cylinder having a piston slidable therein connected to said adjustable part for moving the latter to an extent corresponding to the movement of the piston and a port formed in the cylinder at each side of the piston for the introduction to and discharge of fluid from the cylinder, flexible conduit means connected to said ports for directing fluid from the pressure source to one side of the piston and discharging fluid from the other, a valve device carried by the cylinder adjacent the discharge port thereof and having closure means, said valve device being normally open to establish communication between the cylinder and the discharge conduit, means serving as a pulley carried by said piston at a location remote from said cylinder, a flexible member trained on said pulley means and connected at one end to said valve closure means for closing the latter upon the application of tension to said flexible member, means for anchoring the other end of said flexible member, whereby upon a predetermined movement of said piston said flexible member is placed under tension to close said valve device and stop the piston, and means accessible to the tractor operator and controllable from his station thereon for adjusting the position of said flexible member with respect to said anchoring means, whereby the stroke of said piston and therefore the extent of movement of the implement adjustable part may be varied.

5. In power control means for an agricultural machine having an adjustable part and a source of fluid under pressure, a hydraulic ram carried by the machine comprising a cylinder having a piston slidable therein connected to said adjustable part for moving the latter to an extent corresponding to the movement of the piston and a port formed in the cylinder at each side of the piston for the introduction to and discharge of fluid from the cylinder, conduit means connected to said ports for directing fluid from the pressure source to one side of the piston and discharging fluid from the other, control means on the machine accessible to the operator for directing fluid from the pressure source to the cylinder to move said piston and for the return of fluid therefrom, including means for cutting off the flow of fluid in said conduits to form a closed circuit in said conduits and cylinder, a valve device carried by the cylinder adjacent one port thereof, said valve device comprising a plunger parallel to the ram piston and longitudinally movable between valve-open and closed positions, resilient means biasing said plunger to valve-open position, and means actuated by movement of the piston for urging said plunger to valve-closed position, said last mentioned means being yieldable to accommodate opening of the valve device upon reversing of the flow of fluid in said circuit to initiate movement of the ram piston in the other direction.

6. A hydraulically operated power transmission assembly comprising a source of fluid pressure, a cylinder, a piston rod slidable in the cylinder, a port formed in said cylinder at each side of said piston, means for directing fluid under pressure to one of said ports and discharging fluid from the other port, a valve device carried by the cylinder in communication with one said port, said valve device including a plunger slidable therein between valve-open and valve-closed positions, means automatically operable to close the valve device and lock the piston rod relative to the cylinder comprising closing means carried by the piston rod operative to move said plunger to valve-closed position in response to movement of said rod, said plunger being so constructed and arranged with reference to the fluid passing through said valve device as to react against the fluid pressure in the cylinder which will urge the plunger to valve-closed position in advance of and independently of the operation of said closing means, whereby lost motion is provided between the closing means and the plunger to accommodate opening of the valve device upon reversing the flow of fluid in the cylinder.

7. A hydraulically operated power transmission assembly comprising a source of fluid pressure, a cylinder, a piston slidable in the cylinder, a port formed in said cylinder at each side of said piston, a conduit connecting each of said ports to said source of fluid pressure, control means for directing fluid under pressure to either of said ports and discharging fluid from the other port, a valve device carried by the cylinder adjacent one said port, said valve device including a plunger slidable therein parallel to said piston between valve-open and valve-closed positions, spring means normally urging said plunger to valve-open position for the discharge of fluid from the associated port, a member secured to said piston at a location remote from the cylinder and extending therefrom to a position in general alinement with said plunger, flexible connecting means between the plunger and said member operative to close said valve device after said piston has been driven a predetermined distance, said plunger being so constructed and arranged with reference to the fluid passing through said valve device as to react against the fluid pressure in the cylinder which will urge the plunger to valve-closed position in advance of and independently of the operation of said flexible connecting means, whereby lost motion is provided in said connecting means to accommodate opening of the valve device upon reversing the flow of fluid in the cylinder.

8. In a hydraulic power adjuster for a vehicle-mounted tool advanceable to an operative position and retractible therefrom, a two-way hydraulic ram comprising a fluid containing chamber divided into two interior portions by a work member movable therein pursuant to changing the volume ratio of said chamber portions, means for operably connecting the ram work member with said tool to transmit retracting force thereto from the work member when the latter forcibly moves in one direction volumetrically expanding one of the chamber portions and contracting the other, fluid conducting passages communicating through the wall of said chamber respectively with said chamber portions, means including a manually controlled valve placeable in one position for causing fluid to enter the one chamber portion through one of said passages while discharging from the other chamber portion through the other passage to forcibly move the work member in the one direction for retracting the tool, said manually controlled valve means being placeable in another position to reverse the flow of fluid whereby fluid enters said other chamber portion through the other passage and is exhausted from the one chamber portion through the one passage to cause advancement of the tool; and means for selectively predetermining the distance the tool is advanced comprising a stop valve device disposed in said one passage, said stop valve device being openable responsively to the pressure of fluid entering said one passage en route to the one chamber portion and being adapted to remain open during subsequent expelling of fluid from the one chamber through the one passage but being subjected to and closable by such expelling fluid following impartation of an initiating closing movement to such stop valve device toward the closed position thereof, and a valve-closing means connected for movement with the work member and adapted to impart the initiating closing movement to the stop valve device when moved with said work member in the other direction, said valve-closing means being adjustable in its position relatively to said work member to selectively correlate the position of the work member and the time the initiating closing movement is imparted to the stop valve device.

9. In a hydraulic power adjuster for a vehicle-mounted tool advanceable to an operative position and retractible from such position; a hydraulic ram comprising a cylinder and a piston; means for connecting the cylinder with the vehicle; means for connecting the piston with said tool for causing retraction of such piston and of the tool attendant to fluid entering one end of the cylinder, the fluid being expelled from said end of the cylinder attendant to advance of such piston and of the tool, a passage in the cylinder wall for conducting the fluid to and from said end of the cylinder, a valve device in said passage, said valve device being openable by the pressure of fluid entering the passage en route to said end of the cylinder, said valve device being adapted to remain open during expulsion of the fluid through said passage but also being adjustable toward the closed position by impartation thereto of a valve closing initiating movement whereupon said valve device is closable by force imparted thereto by the fluid being expelled through said passage; means connected with said piston for imparting the closing initiating movement to the valve device incident to advance movement of the piston and of the tool to thereby preclude further advance thereof, and said valve-closing initiating means being adjustable relatively to the piston for selectively determining the advance position of the tool when the closing initiating movement is imparted to the valve device.

JACOB V. DYRR.

REFERENCES CITED

The following references are of record in the file of this patent:

UNITED STATES PATENTS

| Number | Name | Date |
| --- | --- | --- |
| 1,455,224 | Paoli | May 15, 1923 |
| 1,931,452 | Wheeler | Oct. 17, 1933 |
| 2,223,792 | Muir | Dec. 3, 1940 |
| 2,303,320 | Benjamin et al. | Dec. 1, 1942 |
| 2,320,742 | Newkirk | June 1, 1943 |
| 2,360,070 | Meyerbach | Oct. 10, 1944 |
| 2,383,689 | Silver | Aug. 28, 1945 |

FOREIGN PATENTS

| Number | Country | Date |
| --- | --- | --- |
| 12,190 | Australia | of 1928 |
| 476,590 | Great Britain | Dec. 13, 1937 |